Oct. 18, 1949.　　　R. G. GARRETT　　　2,485,274
CUTOFF GAUGE FOR SAW TABLES
Filed July 25, 1945　　　　　　　　　2 Sheets-Sheet 1

Oct. 18, 1949.  R. G. GARRETT  2,485,274
CUTOFF GAUGE FOR SAW TABLES
Filed July 25, 1945  2 Sheets-Sheet 2

INVENTOR.
Roy G. Garrett
BY Loyd J. Miller
ATTORNEY

Patented Oct. 18, 1949

2,485,274

UNITED STATES PATENT OFFICE 2,485,274

CUTOFF GAUGE FOR SAW TABLES

Roy G. Garrett, Edmond, Okla.

Application July 25, 1945, Serial No. 606,921

3 Claims. (Cl. 143—174)

My invention relates to work benches or tables of the type generally used to support lumber while it is being sawed in two, and more particularly to benches used in connection with power driven cross-cut saws which are mounted to be repeatedly moved manually across the bench and through the lumber in a fixed path.

The prime object of the invention is to provide a measuring gauge which may be affixed to the upper surface of the bench and which will act to measure the distance from the path of the saw to the end of the board which is to be cut, said gauge also acting as a stop against which said end may be placed while the board is being severed.

Another object is to provide a measuring gauge of this class, in which the stop may be adjustably affixed selectively at various longitudinal positions with relation to the gauge.

A further object is to provide a device of this class which may be easily and quickly installed upon any usual cross-cut saw bench.

At the present time, it is common practice for the saw operator to measure from the path of the saw along the bench until the distance is equal to the length the board or boards are to be cut, and to then drive a nail, or attach a cleat to the bench. One end of the board is then placed against the stop thus provided. The saw will then cut the board to the measured length.

It is therefore an object of the present invention, to provide a stop mechanism which may be easily and quickly adjustably anchored at various positions along the gauge, without the use of any hand tools.

Other objects and purposes will be apparent from the following description when taken in conjunction with the accompanying two sheets of drawings, wherein.

Like characters of reference designate like parts in all of the figures wherein they occur.

In the drawings.

Figure 1:
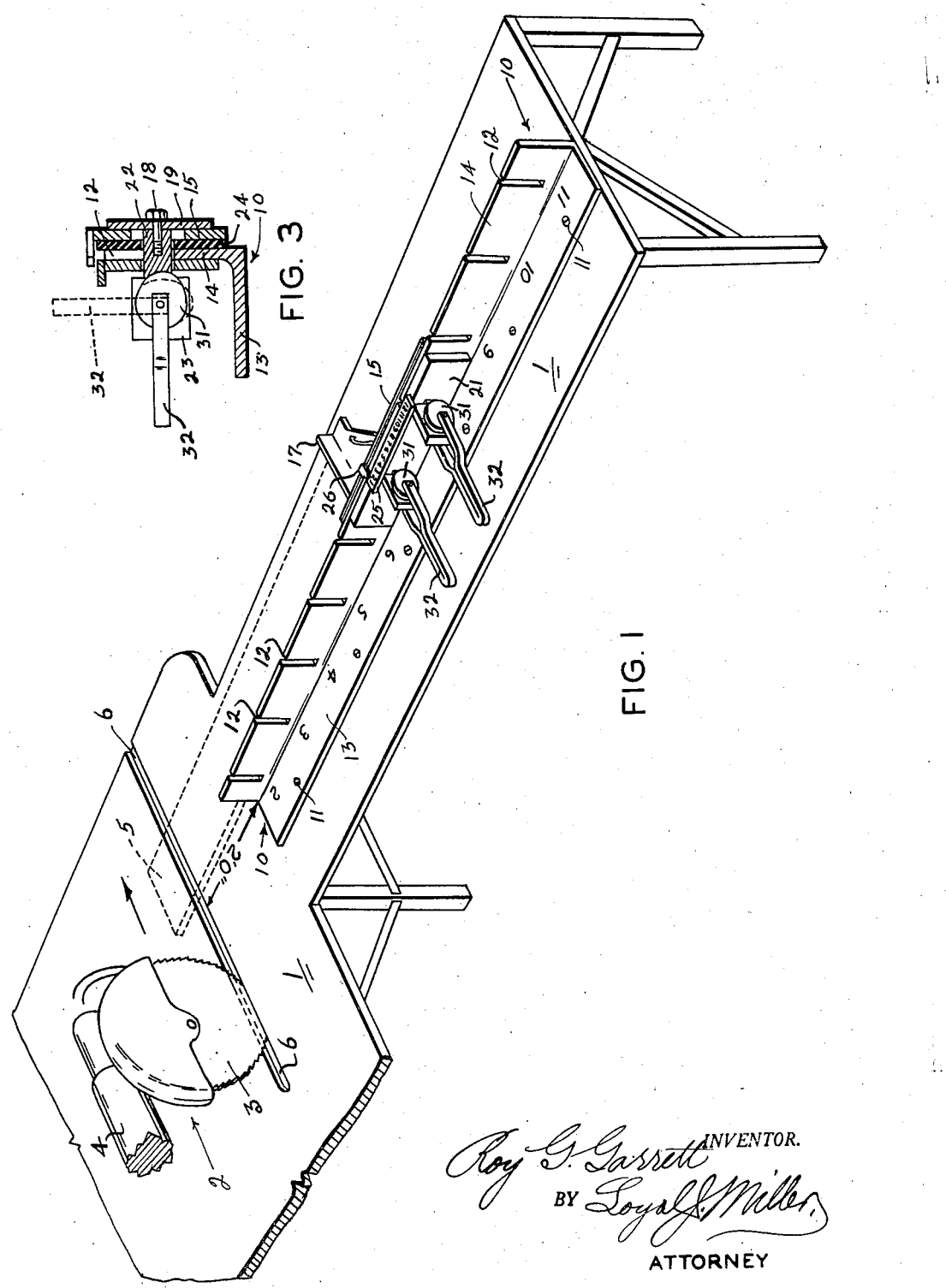
Figure 1 is a perspective view of a work table with the device of the inventor operatively installed thereon.
Figure 2:
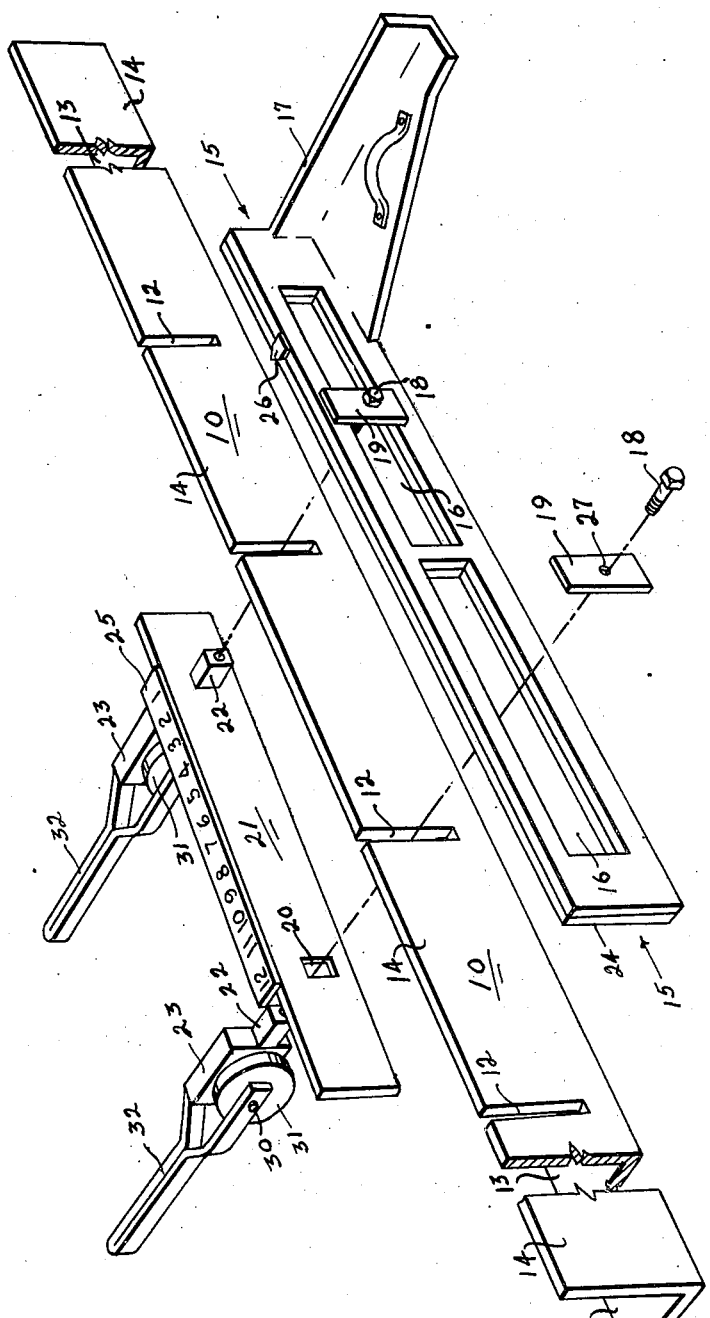
Figure 2 is perspective view showing the various parts of the invention slightly removed from each other, but in their proper relation to each other; and, Figure 3 is vertical sectional view detailing one of the clamping elements and its relation to other elements of the device.

The reference numeral 1 indicates, as a whole, a usual work bench or table having a flat horizontal upper surface. The numeral 2 indicates, as a whole, a usual power driven cross-cut saw mechanism, and includes a rotating disk saw blade 3. A suitable overhead arm 4 is provided on the mechanism 2 whereby the blade 3 may be manually moved horizontally across the table, in the direction indicated by the arrow in Fig. 1 in order to sever a board 5 lying flatly upon the table top. The table 1 has a transverse through slot 6 which forms a path for the blade 3, and into which the lower portion of the blade projects, and along which it travels when manually moved.

The elements above described and indicated by the reference numerals 1 to 6 inclusive are usual, and are not a part of the present invention. However, they closely relate to the invention since it is upon the top of the table 1 that the device of the invention is installed, and the measuring portion of the device is calibrated to measure distances from the slot or groove 6.

The device per se, of the invention includes:

A straight angle iron supporting member or work guide 10 which has one of its flanges firmly anchored to the table top by a suitable plurality of detents 11. The other flange of the member 10 projects vertically from the table top, and is provided with a plurality of spaced through notches or slots 12 which are cut downwardly into its free upper edge. The horizontal and vertical flanges or legs of the member 10 are indicated respectively by the reference numerals 13 and 14. In the illustrated embodiment of the invention, the notches 12 are spaced one foot apart, and each notch is designated by one numeral of a row thereof which are carried by the flange 13. The office of the notches 12 will be more fully described hereinbelow.

The device of the invention further includes an adjustable stop mechanism which is adapted to be installed upon the upright flange 14, and which includes an adjustable abutment against which one end of the board 5 may be placed while the saw blade 3 is severing its other end portion. The stop mechanism includes a plate 15, preferably of metal, which has two elongated through openings or slots 16 and an outwardly extending horizontal abutment or stop member 17. A pair of threaded studs 18 each passes through a perforation 27 in a rectangular washer, head or enlargement 19, and is threaded into the end of a substantially square extension 22 on one end of a blade 23. The extension 22 of the blade 23 passes through a substantially square perforation 20 in a clamping plate or member 21, through one of the slots 12 in the flange 14, and through one of the openings 16 in the plate 15. The extensions 22 are of a length slightly greater than the combined thicknesses of the plate 21, the flange 14, and the plate 15 which is faced with a sheet 24 of rubber. When the studs 18 are fully tightened, the two plates 15 and 21 are not forced into clamping engagement with the flange 14, but have approximately one-sixteenth to one-eighth of an inch play with relation to the flange 14.

As a means for clamping the two plates 15 and 21 against opposite surfaces of the flange 14, each of the blades or blocks 23 is equipped with a transverse pivot pin 30 upon which is rigidly mounted an eccentric cam 31 having a rigidly connected handle 32. The cams 31 are so arranged that when the handles 32 are moved from a vertical position downwards toward the table top, the two plates 15 and 21 will be clamped against the flange 14. The rubber sheet 24 acts to facilitate the clamping or frictional engagement of the plate 15 with the flange 14. When the handles 32 are moved to vertical positions, the plates 15 and 21 will be loosened.

When the two plates 15 and 21 are clamped to the member 10, the abutment 17 lies in the proper position on the table to act as a stop for one end of the board 5, when the board is placed flatly on the table across the slot 6 and beside the flange 14 of the member 10.

It is apparent that if the cams 31 are loosened, then the plate 15 may be moved longitudinally to place the abutment 17 at various distances with relation to the slot 6 in the table. The amount of such longitudinal movement is limited by the length of the two openings 16 in the plate 15. It is also apparent that when the two cams 31 are loosened, the two assembled plates 15 and 21 may be lifted bodily from the flange 14, and the projection 22 may be reinserted in any desired pair of the slots 12 in the flange 14.

The upper edge of the plate 21 is equipped with a measuring strip 25 which is calibrated in inches from zero to 12, and the upper edge of the plate 15 has a laterally projecting pointing finger 26 which lies above the strip 25 when the two plates are in their assembled positions.

The horizontal flange 13 of the member 10 is calibrated in foot measurements, and these measurements represent distances in feet from the saw path or slot 6.

The arrangement is such that when the two plates 15 and 21 are installed upon the member 10, and when the pointing finger 26, is set at zero inches on the strip 25, the abutment 17 will be an exact number of even feet and no inches, from the saw path slot 6. It is therefore possible to place the studs 18 in the correct pair of slots 12 to bring the abutment to the desired distance in feet from the saw path, and to then move the plate 15 along the flange 14 to bring the finger 26 to the desired inch indicia on the strip 25. The cams 31 may then be tightened to hold the abutment 17 stationary. The boards 5 to be cut are then merely placed on the table with an end against the abutment 17 and when a plurality of them are cut, they will all measure identical lengths.

It is thought that the operation of the device may well be understood from the above description without further elucidation, and that anyone versed in the art could construct such a device without being furnished further details. It is also thought that a device has been disclosed hereinabove which will accomplish all of the objects and purposes set forth.

Obviously, certain alterations in structural detail could well be made without materially affecting the practicability of the device, and I therefore do not wish to be limited to the specific embodiment shown and described herein, further than I am limited by the scope of the appended claims.

I claim:

1. In a device of the class described, the combination with a table having a cut-off saw movable in a slot thereacross, of: an elongated vertically projecting work-guiding flange fixed to the table top, and lying at right angles to said slot at one side of said saw; a series of spaced notches cut downwardly into the upper edge of said flange, said notches lying a measured distance apart; an elongated plate slidable on the table along one side face of the flange, said plate having a longitudinal through slot extending throughout the major portion of its length; a vertical abutment fixed to the plate and projecting therefrom in parallel relation to said saw slot; an elongated clamping member extending along the opposite side face of said flange; spaced lateral projections carried by the clamping member and movable laterally with relation thereto, said projections adapted to extend through said notches and through the slot in said plate; an enlargement on the end of each projection to prevent its withdrawal through the plate slot; and a cam for moving each projection, so as to clamp the plate and the clamping member to the flange.

2. Structure as specified in claim 1, and: graduations of length carried by the clamping member; and a pointer carried by said plate for indicating various ones of said graduations.

3. Structure as specified in claim 1, and: numerical indicia for designating said notches.

ROY G. GARRETT.

REFERENCES CITED

The following references are of record in the file of this patent:

UNITED STATES PATENTS

| Number | Name | Date |
|---|---|---|
| 255,302 | Luther | Mar. 21, 1882 |
| 378,939 | Seymour | Mar. 6, 1888 |
| 1,028,529 | Bemis | June 4, 1912 |
| 1,123,711 | Driscoll | Jan. 5, 1915 |
| 1,459,873 | Blackburn | June 26, 1923 |
| 1,566,225 | Mills | Dec. 15, 1925 |
| 1,938,548 | Tautz | Dec. 5, 1933 |
| 2,342,700 | Schnitzer | Feb. 29, 1944 |

FOREIGN PATENTS

| Number | Country | Date |
|---|---|---|
| 207,400 | Germany | Mar. 4, 1909 |